(12) United States Patent
Kaneko et al.

(10) Patent No.: US 8,401,173 B2
(45) Date of Patent: Mar. 19, 2013

(54) TELEPHONE-LINE-CONNECTION METHOD

(75) Inventors: Takashi Kaneko, Kawasaki (JP);
Masaaki Nagasaka, Kawasaki (JP);
Tadahiro Ohta, Kawasaki (JP); Tadaaki Tanaka, Kawasaki (JP); Keita Kobayashi, Kawasaki (JP); Norishige Ichihashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1121 days.

(21) Appl. No.: 11/696,394

(22) Filed: Apr. 4, 2007

(65) Prior Publication Data

US 2007/0297598 A1    Dec. 27, 2007

(30) Foreign Application Priority Data

Jun. 23, 2006  (JP) .................................. 2006-174457

(51) Int. Cl.
*H04M 1/00* (2006.01)
*H04M 3/00* (2006.01)

(52) U.S. Cl. ............. 379/372; 379/142.04; 379/142.05; 379/142.06; 379/139

(58) Field of Classification Search .................... 379/372
See application file for complete search history.

(56) References Cited

U.S. PATENT DOCUMENTS

| | | | | |
|---|---|---|---|---|
| 5,844,974 A | * | 12/1998 | Ichikawa | ........................ 379/138 |
| 5,894,511 A | * | 4/1999 | Jordan | ...................... 379/114.14 |
| 5,937,355 A | * | 8/1999 | Joong et al. | .................... 455/466 |
| 7,046,986 B2 | * | 5/2006 | Amano et al. | .............. 455/404.1 |
| 7,116,767 B2 | * | 10/2006 | Yang et al. | ................ 379/112.04 |
| 2006/0133582 A1 | * | 6/2006 | McCulloch | ...................... 379/45 |

FOREIGN PATENT DOCUMENTS

| | | |
|---|---|---|
| JP | 8-317471 | 11/1996 |
| JP | 2003-348638 | 12/2003 |
| JP | 2005-130267 | 5/2005 |
| JP | 2006-005412 | 1/2006 |

OTHER PUBLICATIONS

A. Johnston, S. Donovan, R. Sparks, C. Cunningham, and K. Summers, "Session Initiation Protocol (SIP) Basic Call Flow Examples", Internet Engineering Task Force, RFC 3665, Dec. 2003.*
Japanese Patent Office "Notification of Reasons of Rejection" issued for corresponding Japanese Patent Application No. 2006-174457, mailed Apr. 12, 2011. English translation attached.

\* cited by examiner

*Primary Examiner* — Duc Nguyen
*Assistant Examiner* — Taunya McCarty
(74) *Attorney, Agent, or Firm* — Myers Wolin, LLC

(57) ABSTRACT

It is determined whether a call-connection condition set to a call-connection device is a first call-connection state or a second call-connection state. When the determination result shows that the first call-connection state is set, a call is connected from an originating terminal to a destination terminal. When the determination result shows that the second call-connection state is set, the call is connected from the originating terminal to the destination terminal and conversation-termination processing is performed without waiting for a disconnection request transmitted from the originating terminal or the destination terminal.

20 Claims, 11 Drawing Sheets

TELEPHONE-LINE-CONNECTION METHOD

BACKGROUND OF THE INVENTION

1. Field of the Invention

The present invention relates to telephone-line connection performed for a call-connection device (a switching device and/or a session-initiation-protocol (SIP) server) configured to connect a call from an originating terminal to a destination terminal, and particularly relates to call connection performed for the call-connection device, the call connection being performed, for example, when a disaster or the like occurs.

2. Description of the Related Art

When a disaster occurs, the switching device and/or the SIP server becomes crowded with safety-confirmation calls made for people staying in the disaster area. In that case, line congestion and/or network congestion occurs due to increased traffic, which makes it difficult to confirm the safety of the people staying in the disaster area in a timely manner.

The prior art describes a safety-confirmation-message-board service being employed when a disaster occurs. However, even if a safety-confirmation-message-board service or the like is provided, the service is not practical enough to confirm the safety of the people staying in the disaster area in a timely manner. Further, advance knowledge, such as using a special phone number, is required so as to use the above-described service.

Still further, the above-described service requires the installation of message-accumulation servers at many sites in the country in a distributed manner. The above-described technologies have been disclosed in Japanese laid open patent application No. 8-317471 and Japanese laid open Patent application No. 2003-348638, for example.

SUMMARY OF THE INVENTION

Accordingly, it is an object of the present invention to provide a technology for easily performing safety confirmation in disaster situations without placing a load on the communication network by using existing telephone lines and/or mobile-phone networks.

The following configurations are used, so as to achieve the above-described object.

As first means, there is provided a telephone-line-connection method for a call-connection device configured to connect a call from an originating terminal to a destination terminal. The telephone-line-connection method includes determining whether a call-connection condition set to the call-connection device is a first call-connection state or a second call-connection state, connecting the call from the originating terminal to the destination terminal when a result of the determination shows that the call-connection condition is the first call-connection state, and performing call connection processing for connecting the call from the originating terminal to the destination terminal and performing call-termination processing without waiting for a disconnection request transmitted from the originating terminal or the destination terminal when the determination result shows that the call-connection condition is the second call-connection state.

In addition the embodiment may optionally include that the call-connection condition set to the call-connection device is specified by a maintenance terminal. The embodiment further optionally including, when the determination result shows that the call-connection condition is the second call-connection state, the call-connection processing and the call-termination processing are performed after a lapse of predetermined time.

The embodiment further optionally including that, where the determination result shows that the call-connection condition is the second call-connection state and before performing call-connection processing, further comprising: detecting whether or not a number of the call made by the originating terminal is a predetermined number, wherein, where it is detected that the call number is the predetermined number, the call-connection device performs call-connection processing by performing the first connecting step, and wherein, where it is detected that the call number is not a predetermined number, the call-connection device performs the call-connection processing by performing the second connecting step.

The embodiment further optionally including that, at the second connecting step during the call-connection processing, the call-connection device transmits a message signal before performing the call-termination processing so that a predetermined message is transmitted to at least one of the originating terminal and the destination terminal. Further optionally defined that the predetermined message provides an indication of the originating terminal's telephone number to the destination terminal. In addition a further optional embodiment includes that the call-termination processing discontinues a call attempt prior to completing a connection for communication, but after signaling provides a predetermined message.

Another embodiment of the present invention includes a computer readable medium embodying a computer executable code for causing a processor of a call-connection device configured to connect a call from an originating terminal to a destination terminal. The computer executable code cause a computer to execute processing call connection requests from originating terminals to destination terminals; performing call-connection processing for connecting the call from the originating terminal to the destination terminal; and performing call-termination processing without waiting for a disconnection request transmitted from the originating terminal or the destination terminal. In addition a further optional embodiment includes causing the processor to transmit a message signal before performing the call-termination processing so that a predetermined message is transmitted to at least one of the originating terminal and the destination terminal.

When an ordinary call is made, the present invention allows for decreasing a load on the communication network by automatically disconnecting the call at the server (and/or the switching device) after storing data on the incoming-call history in the destination terminal. More specifically, the present invention allows for decreasing a load on the server and/or the network by decreasing the server resources required, so as to make the ordinary call, and the number of signals (packets) flowing through the communication network, so that a stable communication network can be ensured.

Further, even though it is difficult to make the ordinary call in the maximum-congestion situations, the present invention allows for calling the party on the destination side, and stores the incoming-call-history data in the destination terminal. Then, the call is automatically disconnected from the server (and/or the switching device).

Thus, the present invention allows for decreasing the load on the communication network and informing confirmation of the safety to the party on the destination side, for example.

Further, the present invention allows for changing a switch to the above-described system in the disaster situations according to the network-congestion level, and disabling calling in the maximum-congestion situations unless the call number is any of emergency-special phone numbers including 911 (e.g.: in Japan 110, 119, 118) and so forth.

Further, under heavy-load conditions, the present invention allows for performing control so that the time where the originating-side party calls the destination-side party is shifted according to the communication traffic by taking advantage of asynchronism, the destination-side party is called up with stability, and the incoming-call-history data is stored in the destination terminal.

Further, the present invention allows for transmitting text data and/or sound data to the originating terminal and the destination terminal, as additional information, in addition to phone-number data, where the text data and/or the sound data indicates that the server and/or the switching device is in the congestion state, which makes it difficult for the server and/or the switching device to perform call connection, and informing the originating terminal that the incoming-call-history data is stored in the destination terminal.

DESCRIPTION OF THE PREFERRED EMBODIMENTS

Hereinafter, embodiments of the present invention will be described with reference to the attached drawings. The configuration of each of embodiments of the present invention should be construed as an example. Further, the present invention can be achieved without being limited to the above-described configuration.

Figure 1:
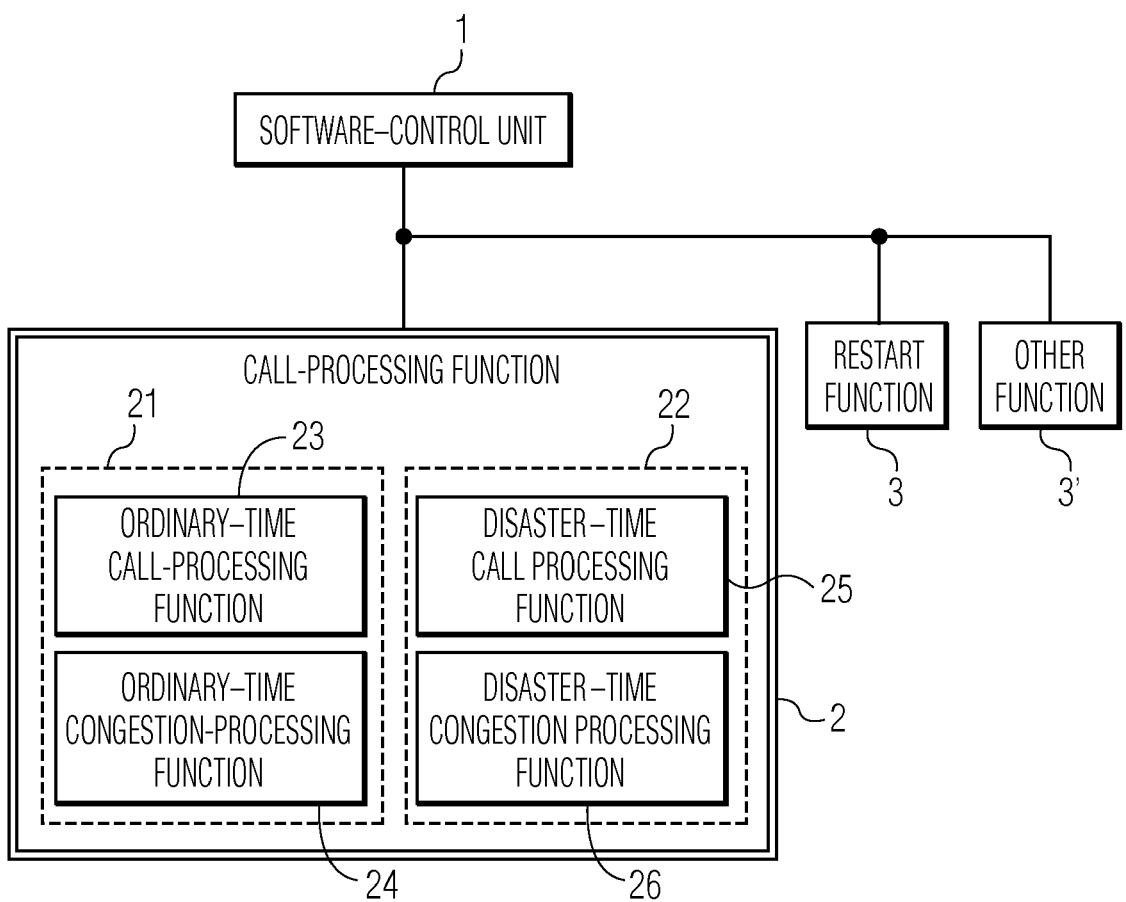
FIG. 1 is an example block diagram showing a call-connection device.

FIG. 1 shows a call-connection device provided as an embodiment of the present invention. The call-connection device is for example a switching device and/or a session-initiation-protocol (SIP) server. The functions of the various elements shown in the figures, for example FIG. 1, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "software-control unit" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Reference numeral 1 shown in FIG. 1 denotes a software-control unit. Reference numeral 2 denotes a call-processing function provided, for example, as a program. Reference numerals 3 and 3' denote different functions, where each of the different functions is configured, as a switching device and/or a program of a SIP server. For example, each of reference numerals 3 and 3' may denote a restart function provided, so as to restart a system.

The call-processing function 2 includes an ordinary-time function 21 and a disaster-time function 22. The ordinary-time function 21 includes an ordinary-time-call function 23 and an ordinary-time congestion function 24. The disaster-time function 22 includes a disaster-time-call function 25 and a disaster-time-congestion-processing function 26.

In an exemplary embodiment the software-control unit 1 reads data from each of the above-described functions, and performs processing compliant with the read function data.

Figure 2:
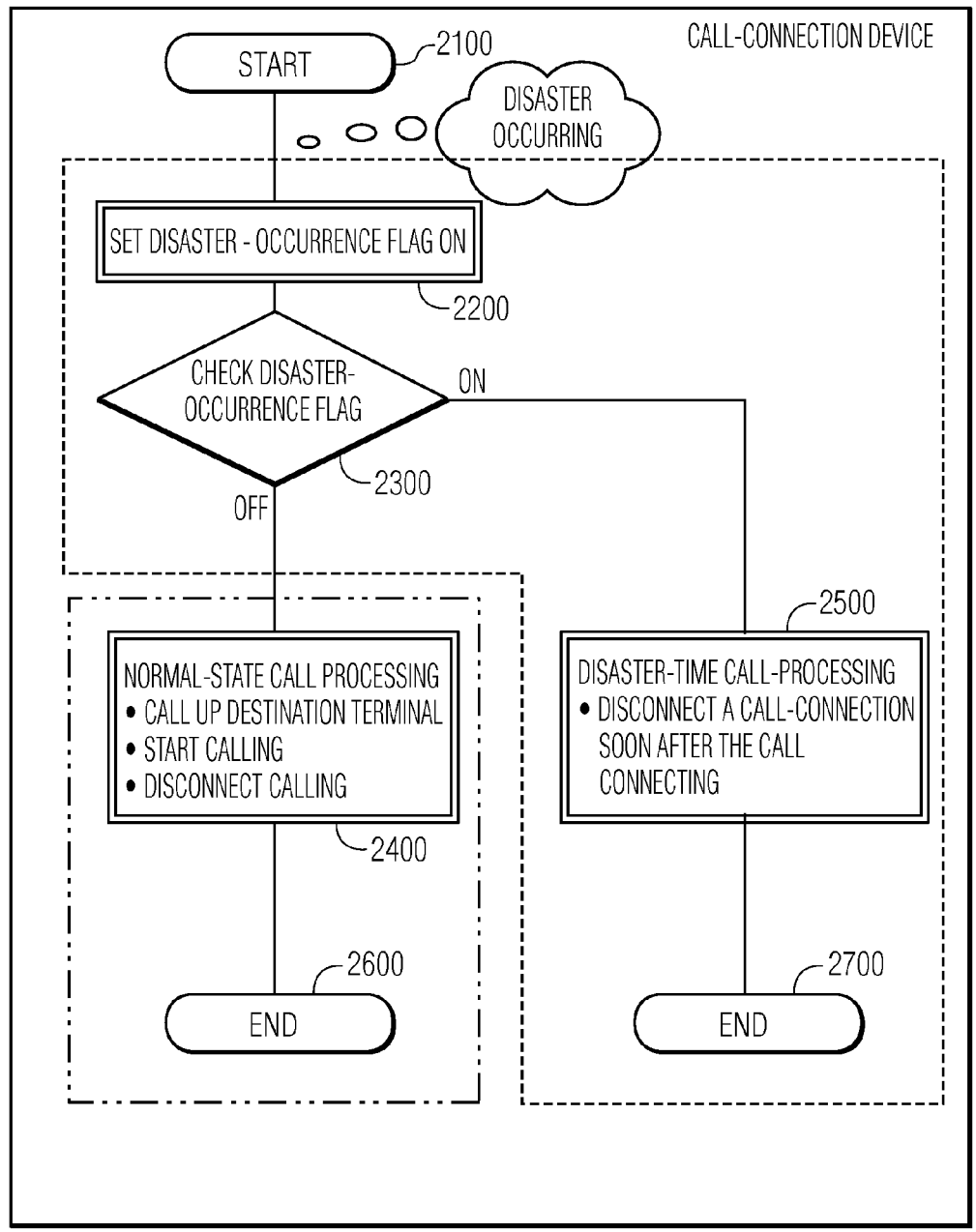
FIG. 2 is an example flowchart illustrating processing procedures performed for call-processing provided in the call-connection device.

FIG. 2 shows a flowchart illustrating processing procedures performed by the call-processing function provided in the call-connection device. More specifically, FIG. 2 shows operations of the call-processing function of the software-control unit 1 of the switching device and/or the SIP server to which a destination terminal is connected, the software-control unit 1 being shown in FIG. 1.

The above-described processing procedures are started when a call made by an originating terminal is received, at step 2100.

When a disaster occurs, a person in charge of maintenance sets a disaster-occurrence flag, for example through a maintenance-operation terminal 8 positioned in a maintenance center (see FIG. 9), at step 2200. When the disaster is over and/or in an ordinary state, the disaster-occurrence flag is set to an off state.

At step 2300, the state to which the disaster-occurrence flag is set, at step 2200, is detected. If it is detected that the disaster-occurrence flag is set to an off state, the processing advances to step 2400. If it is detected that the disaster-occurrence flag is set to an on state, the processing advances to step 2500.

At step 2400, normal-state-call processing is performed. Namely, at step 2400, the destination terminal is called up. When the destination terminal responds to the call, a call is started. The call is terminated when the destination terminal and/or an originating terminal transmits a request for disconnection.

At step 2600, the processing procedures performed by the call-connection device are terminated, when the call is terminated, at step 2400.

At step 2500, disaster time call processing is performed. At step 2500, the destination terminal is called up. Immediately after the destination terminal is called up, call-disconnection processing is performed according to a request transmitted from the call-connection device. That is to say, a so-called one-ring call is made, in response to the above-described request transmitted from the call-connection device. The one-ring call normally disconnects the call attempt before a connection is made (e.g. disconnecting after a single ring). This leaves an indication on the destination (called) terminal of the telephone number of the calling terminal. There is no actual connection being made, thus in a disaster situation or congestion situation where connection resources are scarce, the SIP server or switch will provide the one-ring call which will confirm to the called terminal the calling number which may indicate the person is alive, for example.

At step 2700, the processing procedures performed by the call-connection device are terminated, when the processing is terminated, at step 2500.

Figure 3:
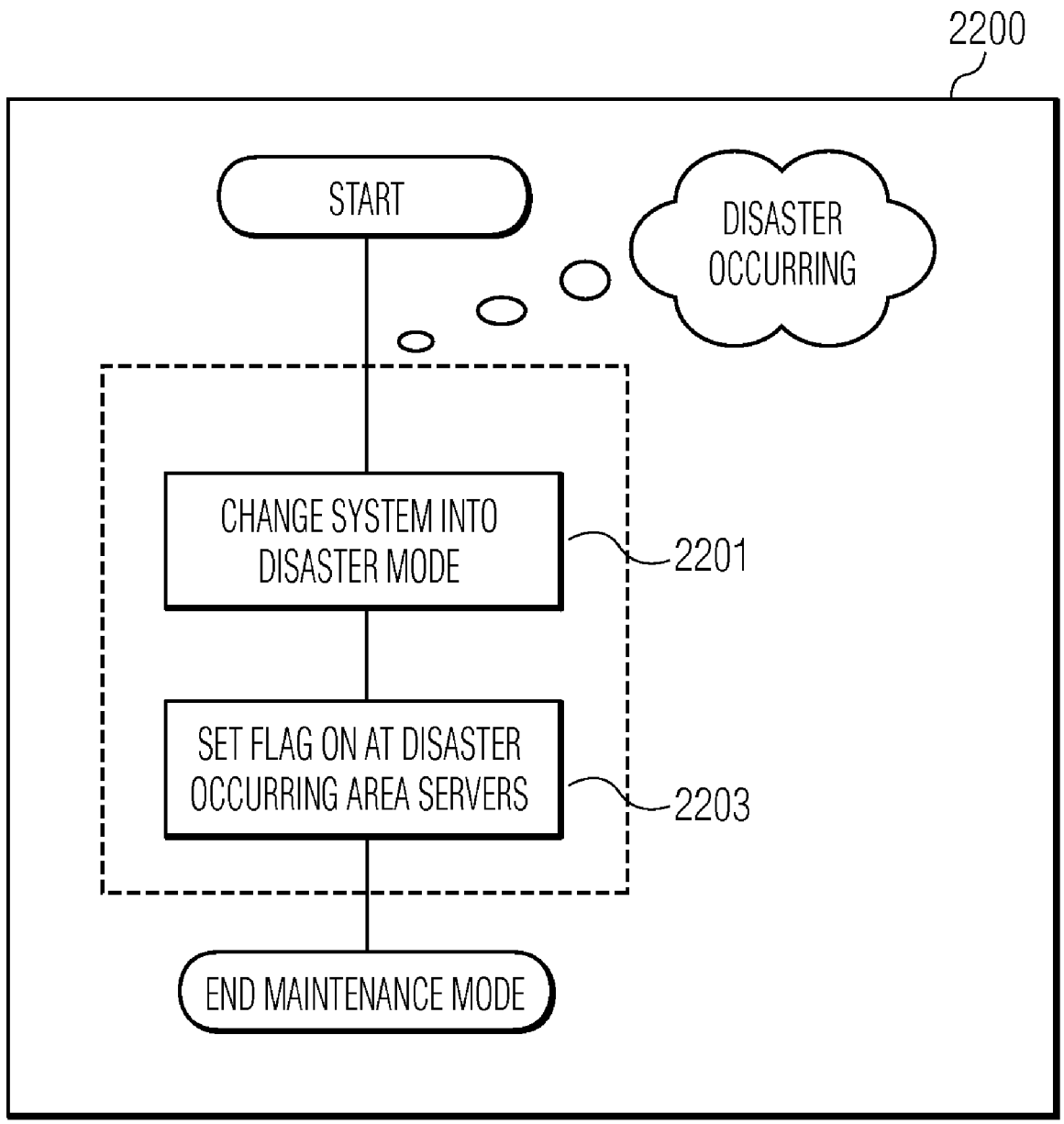
FIG. 3 shows example operations performed at step 2200 shown in the flowchart of FIG. 2.

FIG. 3 shows example operations performed, at step 2200 shown in the flowchart of FIG. 2.

At step 2201, the person in charge of maintenance performs system switching through the maintenance-operation terminal 8 (FIG. 9), when the disaster occurs. More specifically, when the disaster occurs, the person in charge of maintenance sets a disaster-occurrence flag "on" according to a maintenance-operation command. Another embodiment includes automatic setting of the disaster-occurrence flag under predetermined conditions.

At step 2203, a flag of a call-connection device provided in the disaster-occurrence area is turned on according to the maintenance-operation command.

Figure 4:
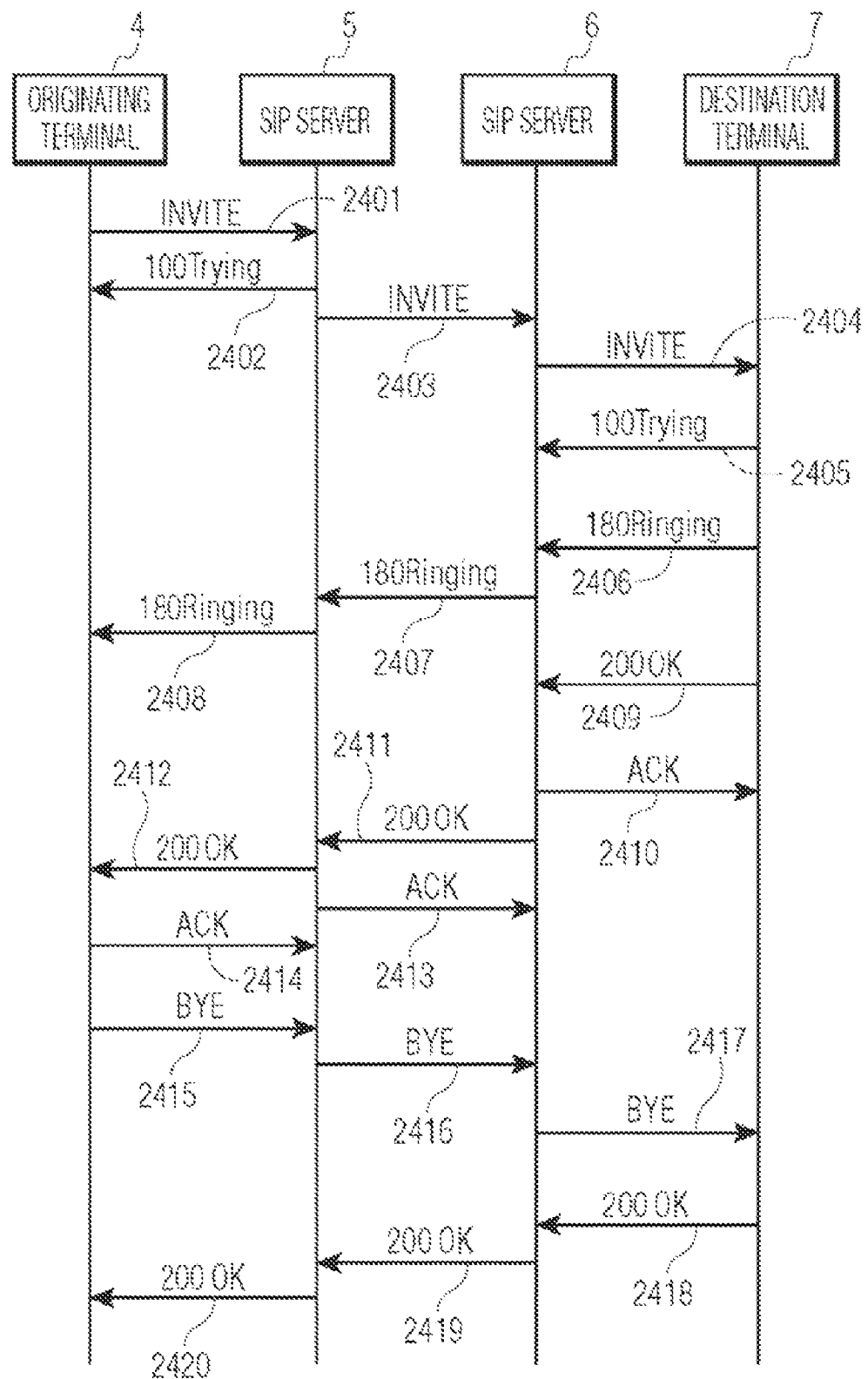
FIG. 4 shows an example of the sequence of operations performed at step 2400 shown in the flowchart of FIG. 2.

FIG. 4 shows and example of the operation sequence of step 2400 shown in the flowchart of FIG. 2. The operations corresponding to step 2400 are performed by a SIP server 6 (FIG. 9) in this example. In FIG. 4 SIP servers are used to represent call-connection devices. However, each of the SIP servers may be replaced, for example, with a known switching device.

A call-setup signal (INVITE) 2401 transmitted from an originating terminal 4 is transmitted to the SIP server 5. The invite signal including, for example, the telephone number of the originating terminal 4.

Upon receiving the call-setup signal (INVITE) 2401, the SIP server 5 transmits a temporary-response signal (100Trying) 2402 to originating terminal 4, and transmits a call-setup signal (INVITE) 2403 to the SIP server 6 with the destination being terminal 7.

Upon receiving the call-setup signal (INVITE) 2403, the SIP server 6 transmits a call-setup signal (INVITE) 2404 to the destination terminal 7 including, for example, the telephone number of the originating terminal 4.

Upon receiving the call-setup signal (INVITE) 2404 transmitted from the SIP server 6, the destination terminal 7 transmits a temporary-response signal (100Trying) 2405 to the SIP server 6. After transmitting the temporary-response signal (100Trying) 2405, the destination terminal 7 further transmits a ring-back tone (180Ringing) 2406 to the SIP server 6.

Upon receiving the ring-back tone (180Ringing) 2406, the SIP server 6 transmits a ring-back tone (180Ringing) 2407 to a SIP server 5.

Upon receiving the ring-back tone (180Ringing) 2407, the SIP server 5 transmits a ring-back tone (180Ringing) 2408 to the originating terminal 4.

After transmitting the ring-back tone (180Ringing) 2406, the destination terminal 7 transmits a response signal (200 OK) 2409 to the SIP server 6 in response to the request (INVITE).

Upon receiving the response signal (200 OK) 2409 transmitted in response to the request, the SIP server 6 transmits an acknowledgment signal (ACK) 2410 to the destination terminal 7 and the SIP server 6 transmits a response signal (200 OK) 2411 to the SIP server 5 in response to the request.

Upon receiving the response signal (200 OK) 2411 transmitted in response to the request, the SIP server 5 transmits an acknowledgment signal (ACK) 2413 to the SIP server 6 and transmits a response signal (200 OK) 2412 to the originating terminal 4 in response to the request.

Upon receiving the response signal (200 OK) 2412 transmitted in response to the request, the originating terminal 4 transmits an acknowledgment signal (ACK) 2414 to the SIP server 5.

When the reception of the acknowledgment signals (ACK) 2414, 2413, and 2410 is completed, a call can be started.

When the call is completed, the originating terminal 4 transmits a call-completion signal (BYE) 2415 to the SIP server 5.

Upon receiving the call-completion signal (BYE) 2415 transmitted from the originating terminal 4, the SIP server 5 transmits a call-completion signal (BYE) 2416 to the SIP server 6.

Upon receiving the call-completion signal (BYE) 2416, the SIP server 6 transmits a call-completion signal (BYE) 2417 to the destination terminal 7.

Upon receiving the call-completion signal (BYE) 2417, the destination terminal 7 transmits a response signal (200 OK) 2418 to the SIP server 6 in response to a request.

Upon receiving the response signal (200 OK) 2418, the SIP server 6 transmits a response signal (200 OK) 2419 to the SIP server 5 in response to the request.

Upon receiving the response signal (200 OK) 2419, the SIP server 5 transmits a response signal (200 OK) 2420 to the originating terminal 4 in response to the request.

In FIG. 4, the generation of the call-completion signal (BYE) is triggered by the originating terminal 4. However, the generation of the call-completion signal (BYE) may be triggered by the destination terminal 7 so that the call-completion signal (BYE) is transmitted to the originating terminal 4 via the SIP servers 6 and 5.

Figure 5:
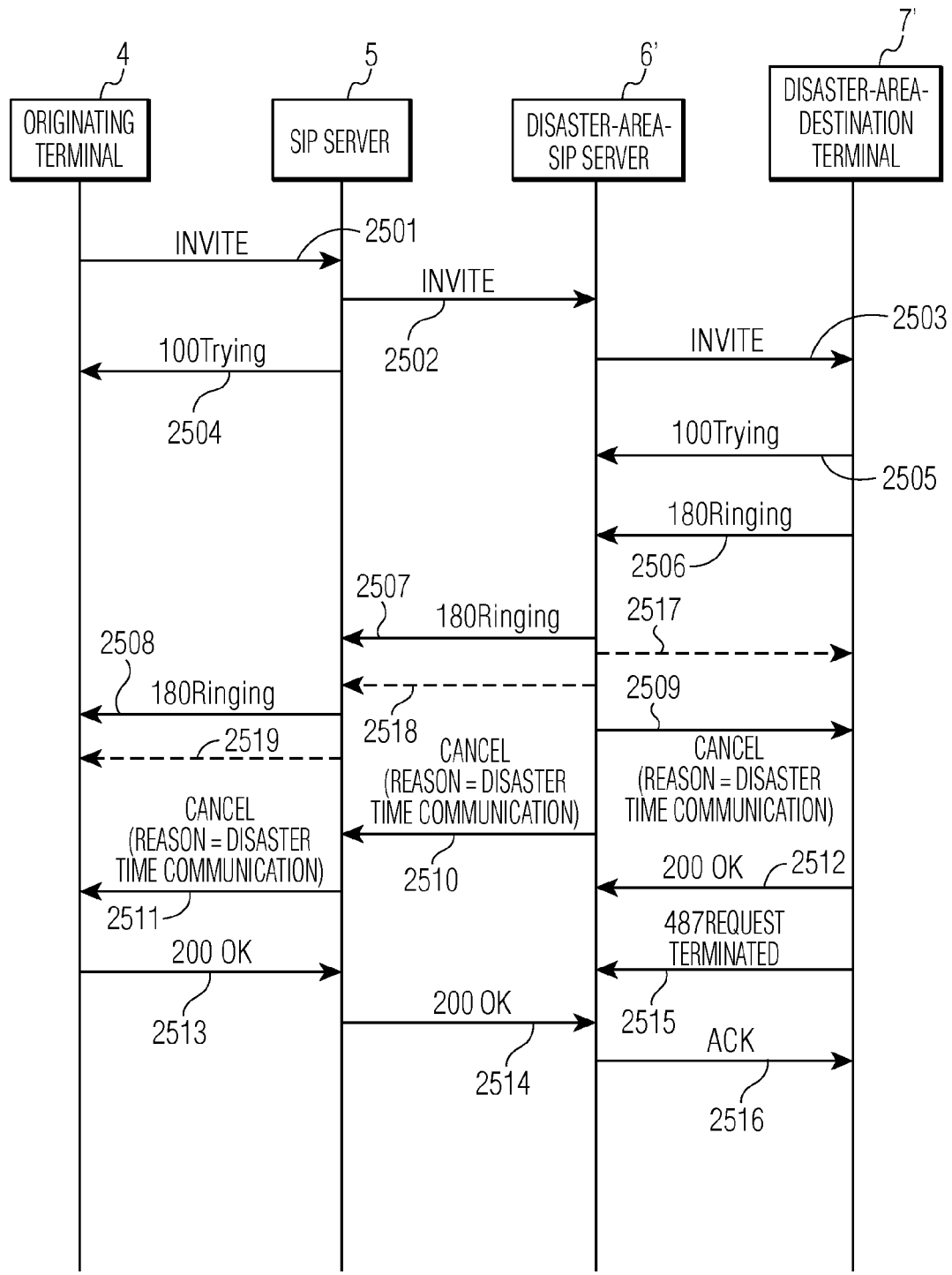
FIG. 5 shows an example of the sequence of operations performed at step 2500 shown in the flowchart of FIG. 2.

FIG. 5 shows an example of the operation sequence of step 2500 shown in the flowchart of FIG. 2. The operations corresponding to step 2500 are performed by a disaster-area-SIP server 6'. In FIG. 5 SIP servers are used as representative of the call-connection device. However, each of the SIP servers may be replaced with, for example, a known switching device.

A call-setup signal (INVITE) 2501 is transmitted from the originating terminal 4 to the SIP server 5.

Upon receiving the call-setup signal (INVITE) 2501, the SIP server 5 transmits a temporary-response signal (100Trying) 2504 to the originating terminal 4 and transmits a call-setup signal (INVITE) 2502 to the disaster-area-SIP server 6' to which a disaster-area-destination terminal 7' belongs.

Upon receiving the call-setup signal (INVITE) 2502, the disaster-area-SIP server 6' transmits a call-setup signal (INVITE) 2503 to the disaster-area-destination terminal 7'.

Upon receiving the call-setup signal (INVITE) 2503 transmitted from the disaster-area-SIP server 6', the disaster-area-destination terminal 7' transmits a temporary-response signal (100Trying) 2505 to the disaster-area-SIP server 6'. Further, after transmitting the temporary-response signal (100Trying) 2505, the disaster-area-destination terminal 7' transmits a ring-back tone (180Ringing) 2506 to the disaster-area-SIP server 6'.

Upon receiving the ring-back tone (180Ringing) 2506, the disaster-area-SIP server 6' transmits a ring-back tone (180Ringing) 2507 to the SIP server 5.

Upon receiving the ring-back tone (180Ringing) 2507, the SIP server 5 transmits a ring-back tone (180Ringing) 2508 to the originating terminal 4.

After transmitting the ring-back tone (180Ringing) 2507 to the SIP server 5, the disaster-area-SIP server 6' sets "disaster-time communication" onto a field "Reason" of a call-disconnection signal (CANCEL) 2509 before call-setup processing is established in the disaster-area-destination terminal 7', and transmits the call-disconnection signal (CANCEL) 2509 to the disaster-area-destination terminal 7'. Further, also for the SIP server 5, the disaster-area-SIP server 6' sets "disaster-time communication" onto the field "Reason" of a call-disconnection signal (CANCEL) 2510 and transmits the call-disconnection signal (CANCEL) 2510 before the call-setup processing is established.

Upon receiving the call-disconnection signal (CANCEL) 2510, the SIP server 5 sets "disaster-time communication" onto the field "Reason" of a call-disconnection signal (CANCEL) 2511 and transmits the call-disconnection signal (CANCEL) 2511 to the originating terminal 4.

Upon receiving the call-disconnection signal (CANCEL) 2509 transmitted from the disaster-area-SIP server 6', the disaster-area-destination terminal 7' transmits a response signal (200 OK) 2512 to the disaster-area-SIP server 6' in response to a request. Further, after transmitting the response signal (200 OK) 2512 to the disaster-area-SIP server 6' in response to the request, the disaster-area-destination terminal 7' transmits a signal (487 Request Terminated) 2515 to the disaster-area-SIP server 6', where the signal 2515 indicates that cancellation is achieved from the terminal side. Further, the disaster-area-destination terminal 7' determines that a disaster-time communication is made on the basis of "disaster-time communication" set in the field "Reason" of the call-disconnection signal (CANCEL).

Upon receiving the call-disconnection signal (CANCEL) 2511 transmitted from the SIP server 5, the originating terminal 4 transmits a response signal (200 OK) 2513 to the SIP server 5 in response to the request. The originating terminal 4 perceives that the disaster-time communication is appropriately made on the basis of "disaster-time communication" set in the field "Reason" of the call-disconnection signal (CANCEL) 2511.

The message "disaster-time communication" set in the field "Reason" of the call-disconnection signal (CANCEL) indicates that the disaster-time communication is appropriately performed. The call-connection device including the SIP server and/or the switching device performs the same processing as normal disconnection.

Upon receiving a response signal (200 OK) 2513 transmitted from the originating terminal 4 in response to the request, the SIP server 5 transmits a response signal (200 OK) 2514 to the disaster-area-SIP server 6' in response to the request.

Upon receiving the signal (487 Request Terminated) 2515 indicating that cancellation is achieved from the terminal side and the response signal (200 OK) 2514 transmitted in response to the request, the disaster-area-SIP server 6' transmits an acknowledgment signal (ACK) 2516 to the disaster-area-destination terminal 7'.

Additional-information signals 2517, 2518, and 2519 are used by the call-connection device, so as to transmit additional information to the originating terminal and the destination terminal. The transmission of each of the above-described additional-information signals is optional. The additional-information signals are composed by one signal or more signals for controlling and showing message.

The additional information is provided as text information and/or sound information indicating, for example, that the call-connection device has entered a congestion state, which makes it difficult for the call-connection device to perform call connection.

By transmitting the additional information to the originating terminal and the destination terminal, the originating terminal and the destination terminal are informed of historical data and the current state of the call-connection device.

Before transmitting the call-disconnection signals (CANCEL) 2510 and 2509, the disaster-area-SIP server 6' transmits the additional-information signal 2517 to the disaster-area-destination terminal 7' and transmits the additional-information signal 2518 to the SIP server 5. Upon receiving the additional-information signal 2518, the SIP server 5 transmits the additional information 2519 to the originating terminal 4. As pointed out above the INVITE signal includes the telephone number, for example, of the originating terminal thus providing an indication of a call even though the call was disconnected before an actual connection, other than signaling, was completed.

Figure 6:
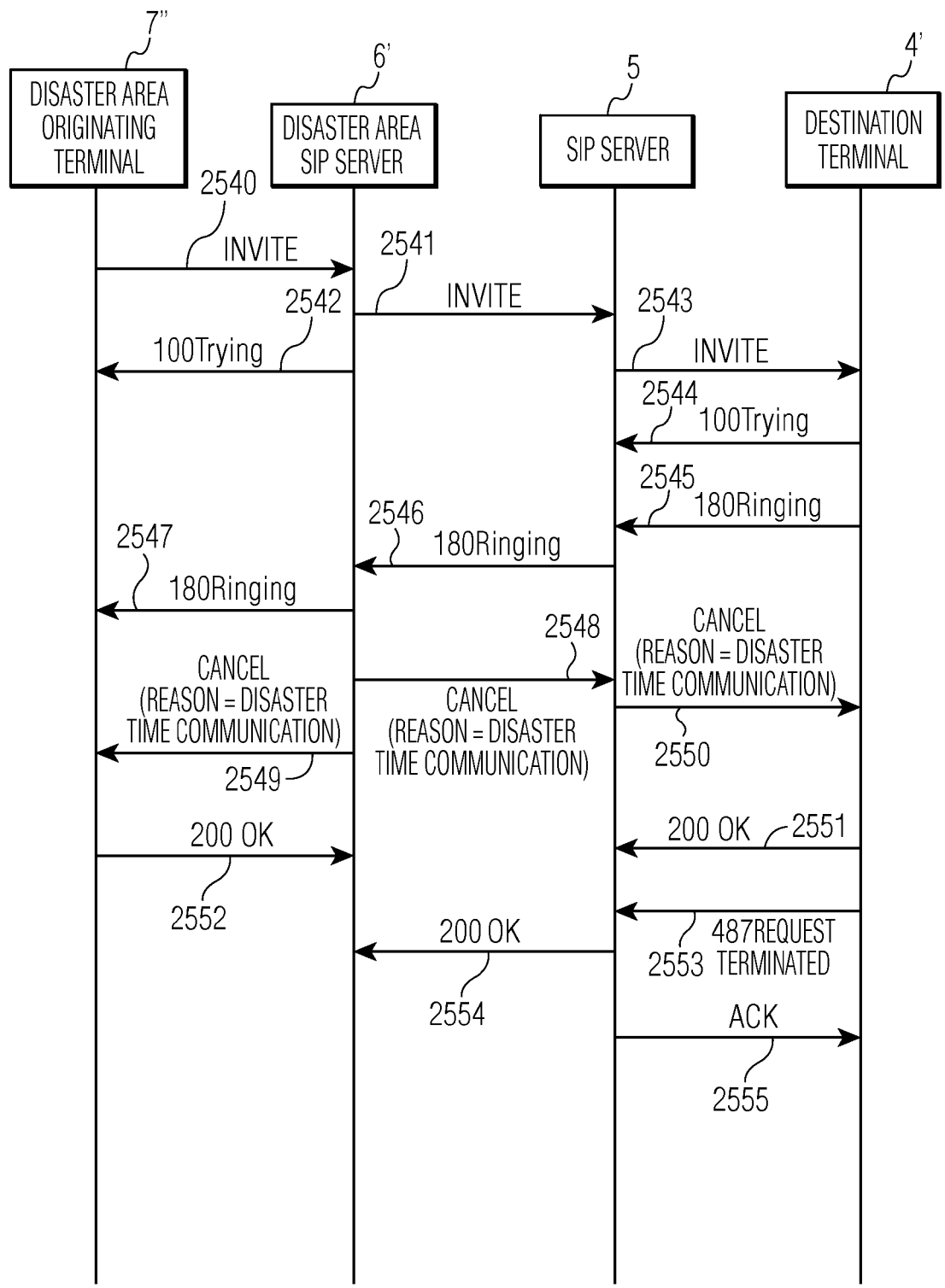
FIG. 6 shows an example of the sequence of other operations performed at step 2500 shown in the flowchart of FIG. 2.

FIG. 6 shows another illustrative operational sequence of step 2500 shown in the flowchart of FIG. 2. The operations corresponding to step 2500 are performed by the SIP server 6'. In FIG. 6, SIP servers are used as representative of the call-connection device. However, each of the SIP servers may be replaced, for example with a known switching device. In FIG. 5, the destination terminal 7' belongs to the disaster-area-SIP server 6'. In FIG. 6, however, the originating terminal 7" belongs to the disaster-area-SIP server 61.

A disaster-area-originating terminal 7" transmits a call-setup signal (INVITE) 2540 to the disaster-area-SIP server 6' including, for example, the telephone number of terminal 7.

Upon receiving the call-setup signal (INVITE) 2540 transmitted from the disaster-area-originating terminal 7", the disaster-area-SIP server 6' transmits a call-setup signal (INVITE) 2541 to the SIP server 5. Further, the disaster-area-SIP server 6' transmits a temporary-response signal (100Trying) 2542 to the disaster-area-originating terminal 7".

Upon receiving the call-setup signal 2541 transmitted from the disaster-area-SIP server 6', the SIP server 5 transmits a call-setup signal (INVITE) 2543 to the destination terminal 4'.

Upon receiving the call-setup signal (INVITE) 2543 transmitted from the SIP server 5, the destination terminal 4' transmits a temporary-response signal (100Trying) 2544 and a ring-back tone (180Ringing) 2545 to the SIP server 5 in that order.

Upon receiving the temporary-response signal (100Trying) 2544 and the ring-back tone (180Ringing) 2545 that are transmitted from the destination terminal 4', the SIP server 5 transmits a ring-back tone (180Ringing) 2546 to the disaster-area-SIP server 6'.

Upon receiving the ring-back tone (180Ringing) 2546 transmitted from the SIP server 5, the disaster-area-SIP server 6' transmits a ring-back tone (180Ringing) 2547 to the disaster-area-originating terminal 7". Further, the disaster-area-SIP server 6' sets "disaster-time communication" onto the field "Reason" of each of call-disconnection signals (CANCEL) 2548 and 2549, transmits the call-disconnection signal (CANCEL) 2548 to the SIP server 5, and transmits the call-disconnection signal (CANCEL) 2549 to the disaster-area-originating terminal 7".

Upon receiving the call-disconnection signal (CANCEL) 2548 transmitted from the disaster-area-SIP server 6', the SIP server 5 sets "disaster-time communication" onto the field "Reason" of a call-disconnection signal (CANCEL) 2550 and transmits the call-disconnection signal (CANCEL) 2550 to the destination terminal 4'.

Upon receiving the call-disconnection signal (CANCEL) 2550 transmitted from the SIP server 5, the destination terminal 4' transmits a response signal (200 OK) 2551 to the SIP server 5 in response to the request. Further, the destination terminal 4' perceives that a disaster-time communication is made, according to "disaster-time communication" set in the field "Reason" of the call-disconnection signal (CANCEL) 2550. Further, the destination terminal 4' transmits a response signal (200 OK) 2551 to the SIP server 5 in response to the request, and transmits a signal (487 Request Terminated) 2553 to the disaster-area-SIP server 5, where the signal 2553 indicates that cancellation is achieved from the terminal side.

Upon receiving the response signal (200 OK) 2551 and the signal (487 Request Terminated) 2553 indicating that the cancellation is achieved from the terminal side that are transmitted from the destination terminal 4', the SIP server 5 transmits a response signal (200 OK) 2554 to the disaster-area-SIP server 6' and transmits an acknowledgment signal (ACK) 2555 to the destination terminal 4'.

Upon receiving the call-disconnection signal (CANCEL) 2549 transmitted from the disaster-area-SIP server 6', the disaster-area-originating terminal 7" transmits a response signal (200 OK) 2552 to the disaster-area-SIP server 6'. The disaster-area-originating terminal 7" perceives that the disaster-time communication is appropriately performed on the basis of "disaster-time communication" set onto the field "Reason" of the call-disconnection signal (CANCEL) 2549.

Figure 7:
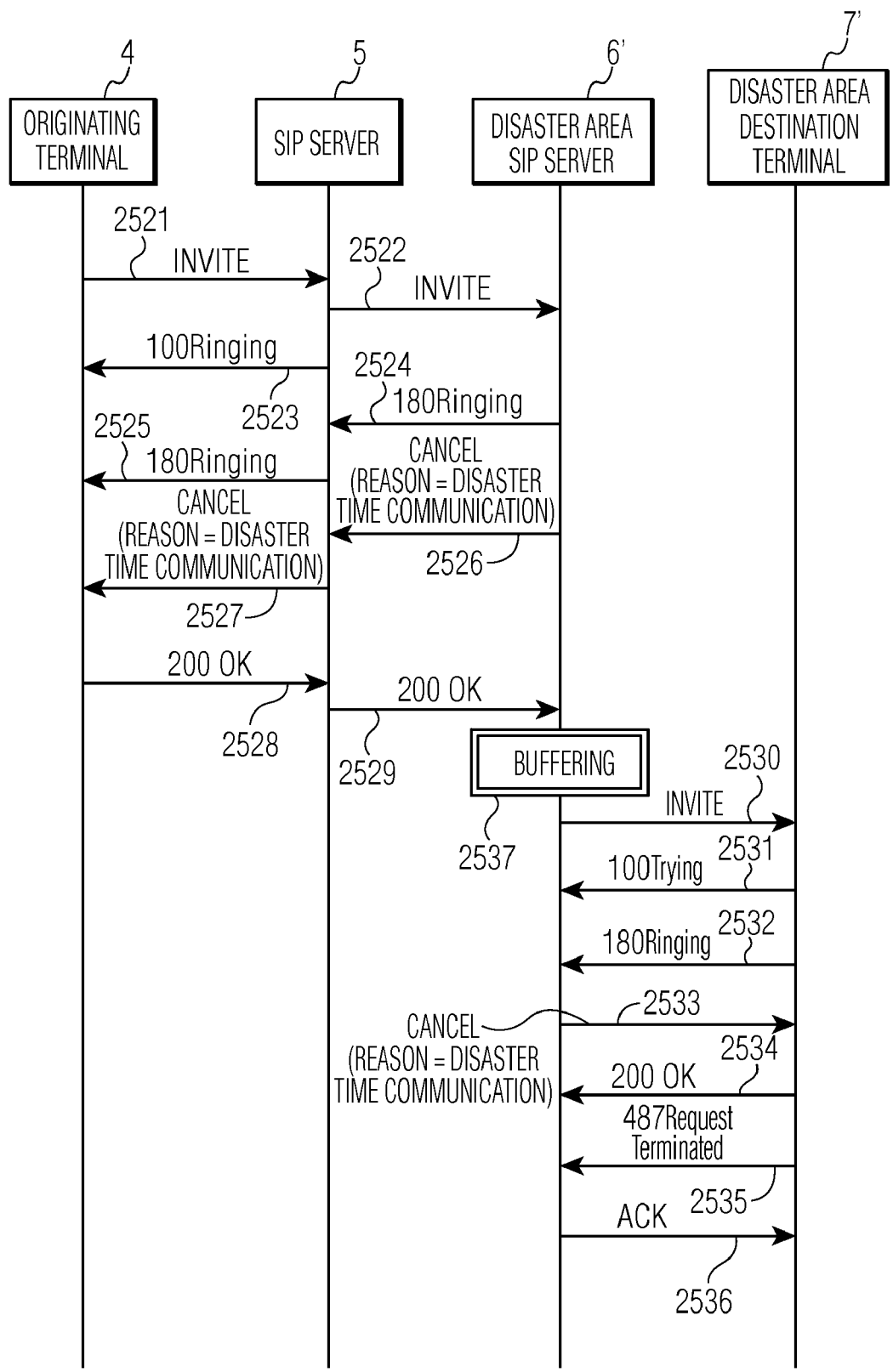
FIG. 7 shows an example of the sequence of other operations performed at step 2500 shown in the flowchart of FIG. 2.

FIG. 7 shows another illustrative operational sequence of step 2500 shown in the flowchart of FIG. 2. The operations corresponding to step 2500 are performed by the SIP server 6'. In FIG. 6, SIP servers are used as representative of the call-connection device. However, each of the SIP servers may be replaced, for example, with a known switching device. In FIG. 7, the destination terminal belongs to the disaster-area-SIP server 6', as is the case with FIG. 5. In FIG. 7, when the destination terminal belonging to the disaster-area-SIP server 6' receives a call, transmission of the call is delayed for a predetermined time period and/or the transmission timing is adjusted.

A call-setup signal (INVITE) 2521 transmitted from the originating terminal 4 is transmitted to the SIP server 5.

Upon receiving the call-setup signal (INVITE) 2521, the SIP server 5 transmits a temporary-response signal (100Trying) 2523 to the originating terminal 4 and transmits a call-setup signal (INVITE) 2522 to the disaster-area-SIP server 6' to which the disaster-area-destination terminal 7' belongs.

Upon receiving the call-setup signal (INVITE) 2522 transmitted from the SIP server 5, the disaster-area-SIP server 6' transmits a ring-back tone (180Ringing) 2524 to the SIP server 5. Further, after transmitting the ring-back tone (180Ringing) 2524 to the SIP server 5, the disaster-area-SIP server 6' sets "disaster-time communication" in the field "Reason" of a call-disconnection signal (CANCEL) 2526 and transmits the call-disconnection signal (CANCEL) 2526 to the SIP server 5.

Upon receiving the ring-back tone (180Ringing) 2524 transmitted from the disaster-area-SIP server 6', the SIP server 5 transmits a ring-back tone (180Ringing) 2525 to the originating terminal 4. Further, after transmitting the ring-back tone (180Ringing) 2525 to the originating terminal 4, the SIP server 5 sets "disaster-time communication" in the field "Reason" of a call-disconnection signal (CANCEL) 2527 and transmits the call-disconnection signal (CANCEL) 2527 to the originating terminal 4.

Upon receiving the call-disconnection signal (CANCEL) 2527 transmitted from the SIP server 5, the originating terminal 4 transmits a response signal (200 OK) 2528 to the SIP server 5 in response to the request.

Upon receiving the response signal (200 OK) 2528 transmitted from the originating terminal 4 in response to the request, the SIP server 5 transmits a response signal (200 OK) 2529 to the disaster-area-SIP server 6' in response to the request. The originating terminal 4 determines that the disaster-time communication is appropriately performed on the basis of "disaster-time communication" set in the field "Reason" of the call-disconnection signal (CANCEL) 2527.

After a lapse of predetermined time 2537 since the call-setup signal (INVITE) 2522 and/or the response signal (200 OK) 2529 corresponding to the request is transmitted, the disaster-area-SIP server 6' transmits a call-setup signal (INVITE) 2530 to the disaster-area-destination terminal 7'.

The disaster-area-destination terminal 7' transmits a temporary-response signal (100Trying) 2531 and a ring-back tone (180Ringing) 2532 to the disaster-area-SIP server 6'.

Upon receiving the ring-back tone (180Ringing) 2532, the disaster-area-SIP server 6' sets "disaster-time communication" in the field "Reason" of a call-disconnection signal (CANCEL) 2533 and transmits the call-disconnection signal (CANCEL) 2533 to the disaster-area-destination terminal 7'.

Upon receiving the call-disconnection signal (CANCEL) 2533 transmitted from the disaster-area-SIP server 6', the disaster-area-destination terminal 7' transmits a response signal (200 OK) 2534 to the disaster-area-SIP server 6' in response to the request. After transmitting the response signal (200 OK) 2534 in response to the request, the disaster-area-destination terminal 7' transmits a signal (487 Request Terminated) 2535 indicating that cancellation is achieved from the terminal side. The disaster-area-destination terminal 7' determines that the above-described communications are made, as disaster-time communications, on the basis of "disaster-time communication" set in the field "Reason" of the call-disconnection signal (CANCEL) 2533.

Upon receiving the signal (487 Request Terminated) 2535 indicating that cancellation is achieved from the terminal side, the disaster-area-SIP server 6' transmits the acknowledgment signal (ACK) 2536 to the disaster-area-destination terminal 7'.

Figure 8:
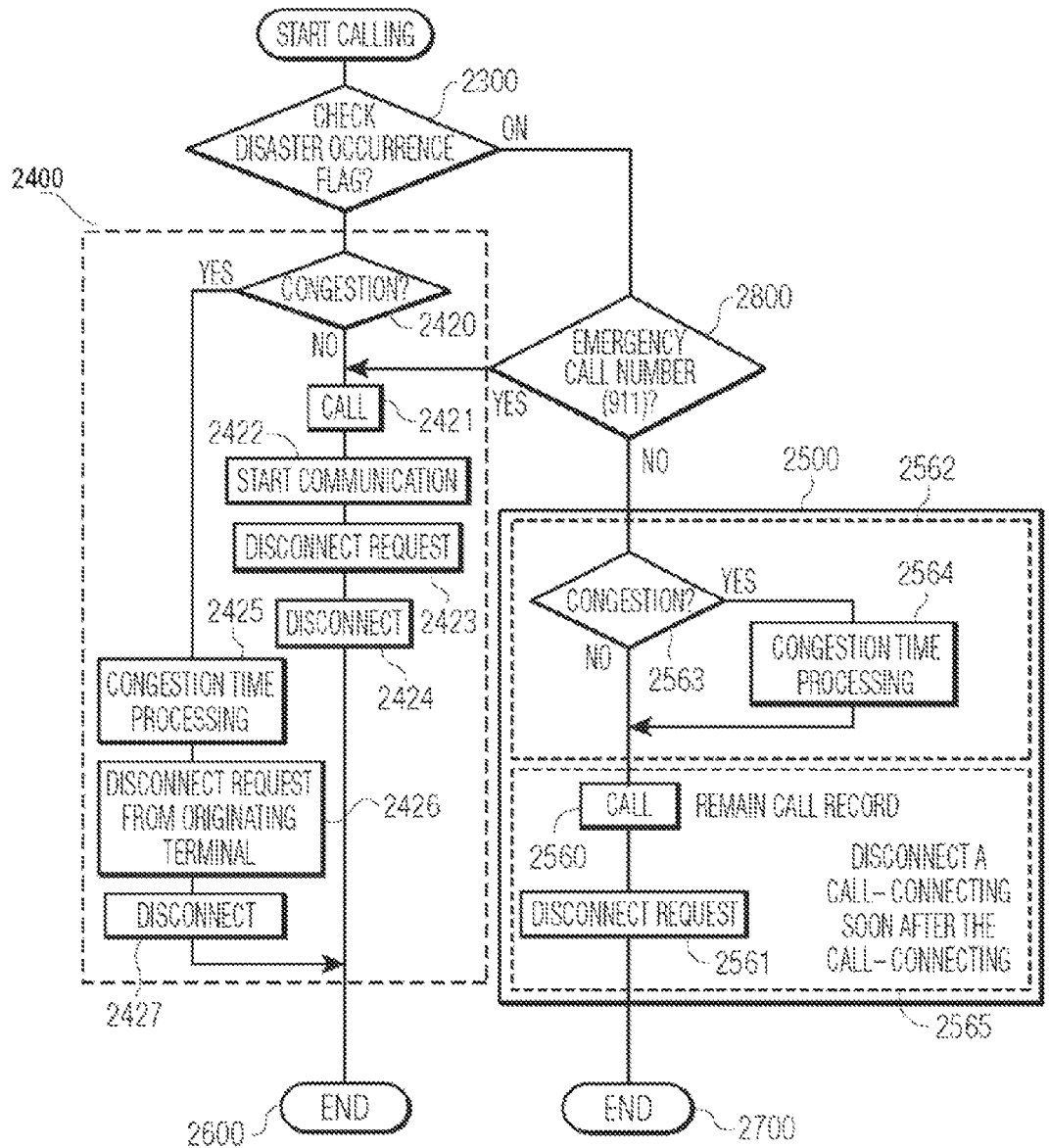
FIG. 8 is an example flowchart illustrating processing performed in the call-connection device.

FIG. 8 shows a flowchart illustrating processing procedures performed in the call-connection device. FIG. 8 shows operations of the call-processing function of the software-control unit 1 shown in FIG. 1, the software-control unit 1 being provided in the switching device and/or the SIP server to which the destination terminal is connected. That is to say, the flowchart shown in FIG. 8 is provided, so as to illustrate the flowchart shown in FIG. 2, where the flowchart shown in FIG. 2 illustrates the processing procedures performed in the call-connection device. In FIG. 8, therefore, the same units and/or members as those shown in FIG. 2 are designated by the same reference numerals as those shown in FIG. 2. Since step 2200 had been described with reference to FIG. 3, the description thereof is not provided in FIG. 8.

At step 2300, a state set by the person in charge of maintenance is detected. If the set state is an 'off' state, the processing advances to step 2400. If the set state is an 'on' state, the processing advances to step 2800.

At step 2800, it is detected whether or not the phone number of a call made by the originating terminal is any of emergency-special phone numbers for example 911 (in Japan e.g.: 110 (Police Department), 119 (Fire Department) and 118 (Coast Guard)). If the detection result shows that the number of the call made by the originating terminal is not an emergency-special phone number, the processing moves to step 2500. At that time, the emergency-special phone numbers may include the phone numbers of lifeline-related business entities including a gas company, an electric-power-utility company, a telephone-service company, a water-supply company, and so forth. On the other hand, if the detection result shows that the number of the call made by the originating terminal is an emergency-special phone number, the processing moves to step 2400. In FIG. 8, the processing moves to step 2421 which performs the call connection for the incoming call.

The processing corresponding to step 2500 includes the congestion-related processing corresponding to step 2562 and the incoming-call-related processing corresponding to step 2565.

The processing corresponding to step 2562 is executed after the processing corresponding to step 2800 is finished. The processing corresponding to step 2562 includes the processing corresponding to step 2563 which is executed, so as to detect whether or not the call-connection device is in the congestion state. The processing corresponding to step 2562 further includes the processing corresponding to step 2564 which is executed, so as to make a delay of a predetermined time period when the call-connection device is in the congestion state.

When it is determined that the number of incoming calls is larger than a reference call number defining the congestion state, at step 2563, it is determined that the call-connection device is in the congestion state, at step 2563.

The processing corresponding to step 2564 is performed so as to make a delay of a predetermined time (few seconds) for a request for connection to the destination side at a predetermined ratio. Otherwise, a delay time is adjusted with reference to the number of incoming calls. After step 2564 is finished the processing moves to step 2565.

The processing corresponding to step 2565 includes the processing corresponding to step 2560 executed to perform the call connection for the incoming call, and the processing corresponding to step 2561 executed so that the call-connection device (the SIP server and/or the switching device) makes a disconnection request (disaster-time communication) immediately after the incoming call arrives. The above-described processing procedures corresponding to steps 2560 and 2561 are performed in that order. Further, the disconnection request (disaster-time communication) is made by the call-connection device (the SIP server and/or the switching device) in the same manner as that in which the disconnection request (normal disconnection) is made.

If it is determined that the disaster-occurrence flag is turned off, at step 2300, the processing advances to step 2400.

The processing procedures performed, at step 2400, will be described, as below.

When the disaster-occurrence flag is turned off, it is detected whether the call-connection device is in the congestion state or in an available state, at step 2420. If the call-connection device is in the congestion state, the processing advances to step 2425. Otherwise, the processing advances to step 2421.

A destination-side terminal is called up, at step 2421. When the destination-side terminal responds to the call, a call is started, at step 2422. Then, the call is disconnected, in response to a disconnection request transmitted from the destination-side terminal and/or an originating-side terminal, at step 2423.

At step 2425, congestion-regulation processing (known regulation processing) is performed. Then, at step 2426, the disconnection request transmitted from the originating-side terminal is recognized, at step 2427 and disconnection is performed.

Figure 9:
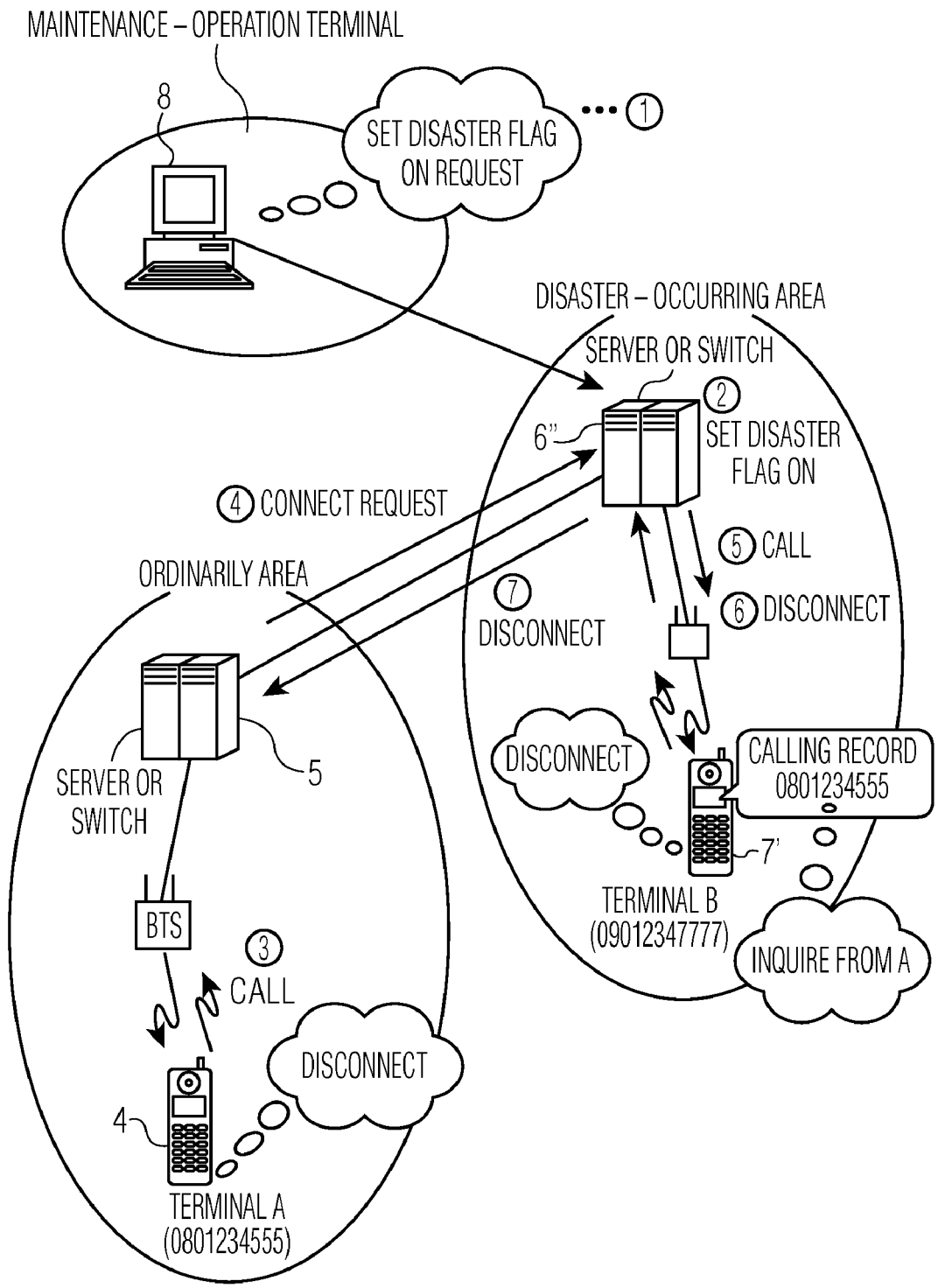
FIG. 9 shows an example of the configuration of services offered by an entire system when the call-connection device is used.

FIG. 9 shows the configuration of services offered by an entire system when a call-connection device according to an embodiment of the present invention is used.

The person in charge of maintenance turns the disaster-occurrence flag on through the maintenance-operation terminal 8. Subsequently, a disaster flag of the call-connection device 6' (the SIP server in the above-described drawings) is turned on, where the call-connection device 6' performs call-connection processing in the disaster area.

Next, an originating terminal operated under the control of the call-connection device 5 (the SIP server or switch in the above-described drawings) provided in a non-disaster area makes a call.

Next, the call-connection device 5 transmits a connection request to the call-connection device 61. Upon receiving the connection request transmitted from the call-connection device 5, the call-connection device 6' calls the destination terminal 7' operated under the control of the call-connection device 6', and performs disconnection processing for the destination terminal 71 and the call-connection device 5. After that, the call-connection device 5 operates disconnection possessing for terminal 4.

Although not shown in FIG. 9, when the call-connection device 6' calls the destination terminal 7' operated under the control of the call-connection device 6', the call-connection device 6' may delay read timing for a predetermined time period (for example FIG. 7, 2537) and perform the disconnection processing after receiving the connection request transmitted from the call-connection device 5.

Figure 10:
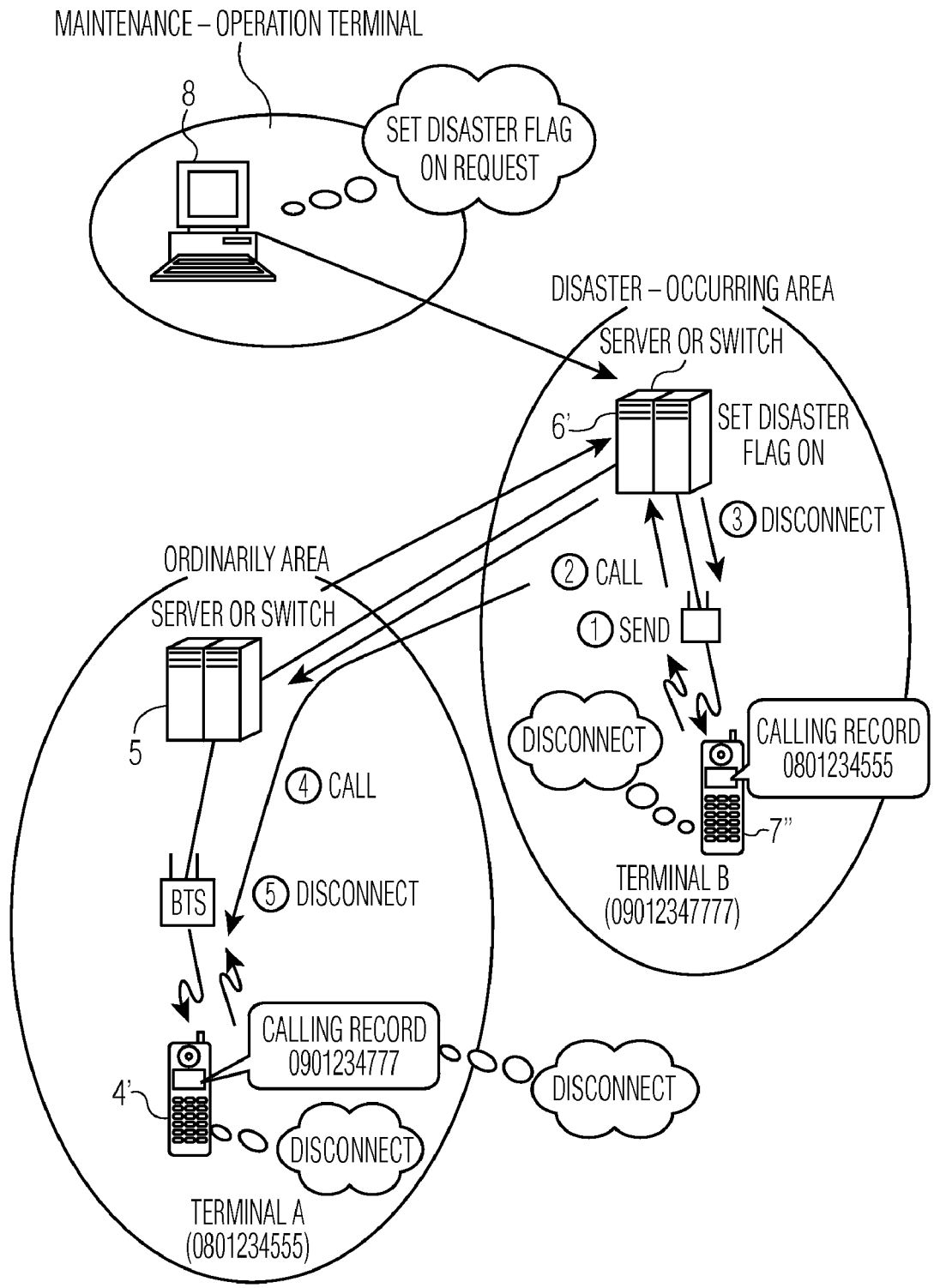
FIG. 10 shows an example configuration of other services offered by the entire system when the call-connection device is used.

FIG. 10 shows the configuration of other services offered by the entire system when a call-connection device according to an embodiment of the present invention is used.

When a disaster occurs, the person in charge of maintenance turns the disaster flag on through the maintenance-operation terminal 8. Subsequently, the disaster flag of the call-connection device 6' (the SIP server or switch in the above-described drawings) is turned on, where the call-connection device 6' performs call-connection processing in the disaster area.

Next, the originating terminal 7" operated under the control of the call-connection device 6' (the SIP server or switch in the above-described drawings) provided in the disaster area makes a call.

Next, the call-connection device 6' transmits a connection request to the call-connection device 5. Upon receiving the connection request transmitted from the call-connection device 6', the call-connection device 5 provided in the non-disaster area calls the destination terminal 4' operated under the control of the call-connection device 5, and performs disconnection processing for the originating terminal 7" and the call-connection device 5. Therefore, terminal 4' obtains calling record form terminal 7'.

Figure 11:
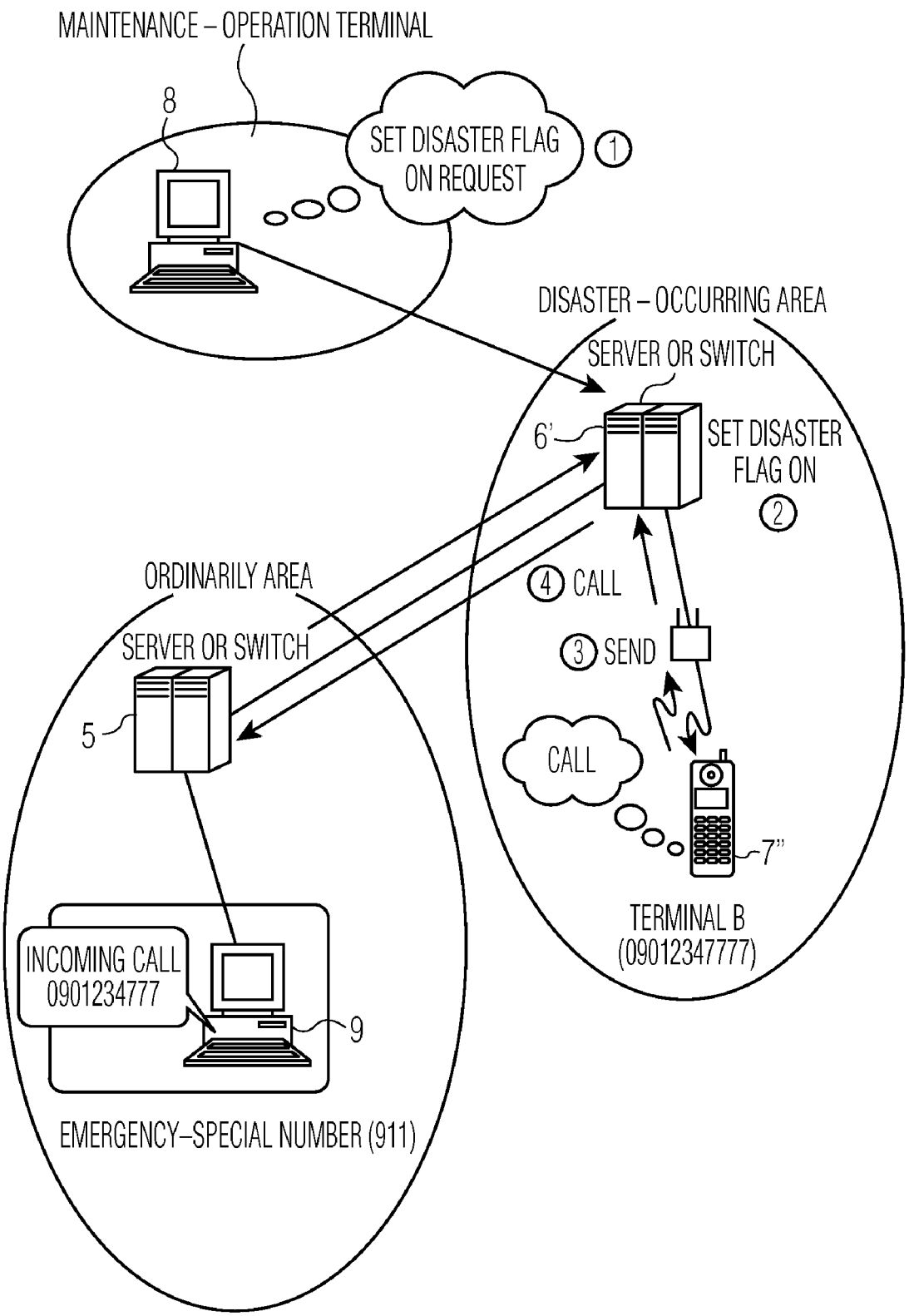
FIG. 11 shows an example configuration of other services offered by the entire system when the call-connection device is used.

FIG. 11 shows the configuration of other services offered by the entire system when a call-connection device according to an embodiment of the present invention is used.

When a disaster occurs, the person in charge of maintenance turns the disaster flag on through the maintenance-operation terminal 8. Subsequently, the disaster flag of the call-connection device 6' (the SIP server or switch in the above-described drawings) is turned on, where the call-connection device 6' performs call-connection processing in the disaster area.

Next, the originating terminal 7" operated under the control of the call-connection device 6' (the SIP server or switch in the above-described drawings) provided in the disaster area makes a call. When the phone number of the call made by the originating terminal 7" is a special phone number, the call-connection device 6' calls the call-connection device 5 provided in the non-disaster area. Next, the call-connection device 5 connects the call to an emergency-special-number-destination terminal 9 and transmits a response transmitted from the emergency-special-number-destination terminal 9 to the call-connection device 6'. Thus, the call can be made between the emergency-special-number-destination terminal 9 and the originating terminal 7" in the disaster situations.

It should be noted that various modifications, combinations, sub-combinations and alterations of the above-described embodiments may occur, as required, insofar as they are within the scope of the appended claims or the equivalents thereof.

The principles of the present invention may be implemented as a combination of hardware and software. The software may be implemented as an application program tangibly embodied on a program storage unit or computer readable medium. The application program may be uploaded to, and executed by, a machine comprising any suitable architecture, for example a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

All examples and conditional language recited herein are intended for pedagogical purposes to aid the reader in understanding the principles of the invention and the concepts contributed by the inventors to furthering the art, and are to be construed as being without limitation to such specifically recited examples and conditions. All statements herein reciting principles, aspects, and embodiments of the invention, as well as specific examples thereof, are intended to encompass both structural and functional equivalents thereof. It is intended that such equivalents include both currently known equivalents as well as equivalents developed in the future, i.e., any elements developed that perform the same function, regardless of structure.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regards any means that can provide those functionalities as equivalent to those shown herein.

What is claimed is:

1. A telephone-line-connection method for a call-connection device configured to connect a call from an originating terminal to a destination terminal, the telephone-line-connection method comprising:
    determining whether a call-connection condition set to the call-connection device is a first call-connection state or a second call-connection state;
    connecting a call from the originating terminal to the destination terminal when a result of the determination shows that the call-connection condition is the first call connection state; and
    performing call-connection processing for connecting the call from the originating terminal to the destination terminal and performing call-termination processing without waiting for a disconnection request transmitted from the originating terminal or the destination terminal when the determination result shows that the call-connection condition is the second call-connection state,
    wherein the performing call-termination processing includes performing call-disconnection processing between the originating terminal and the destination terminal by transmitting a call-disconnection signal from the call-connection device to the destination terminal in response to a ring-back tone signal after transmitting a call-setup signal from the call-connection device to the destination terminal and before a call-setup processing responsive to the call-setup signal is completed in the destination terminal, the call-setup signal instructing an execution of the call-setup processing, the call-disconnection signal instructing an execution of the call-disconnection processing, the ring-back tone signal being transmitted in response to the call-setup signal from the destination terminal to the call-connection device.

2. The telephone-line-connection method according to claim 1, wherein the call-connection condition set to the call-connection device is specified by a maintenance terminal.

3. The telephone-line-connection method according to claim 1, wherein where the determination result shows that the call-connection condition is the second call-connection state, the call-connection processing and the call-termination processing, of the call-connection device, are performed after a lapse of predetermined time.

4. The telephone-line-connection method according to claim 1, wherein where the determination result shows that the call-connection condition is the second call-connection state, the method further comprising:
    detecting whether or not a number of the call made by the originating terminal is a predetermined number before performing the call-connection processing,
    wherein, where it is detected that the call number is the predetermined number, the call-connection device performs the call-connection processing without performing the call-termination processing prior to the disconnection request, and
    wherein, where it is detected that the call number is not a predetermined number, the call-connection device performs the call-connection processing and performs the call-termination processing without waiting for the disconnection request.

5. The telephone-line-connection method according to claim 1, wherein, where it is detected that the call number is not a predetermined number, the call-connection device transmits a message signal before performing the call-termination processing so that a predetermined message is transmitted to at least one of the originating terminal and the destination terminal.

6. The telephone-line-connection method according to claim 5, wherein the predetermined message provides an indication of the originating terminal's telephone number to the destination terminal.

7. The telephone-line-connection method according to claim 1, wherein the call-termination processing discontinues a call attempt prior to completing a connection for communication, but after signaling provides a predetermined message.

8. A call-connection device configured to connect a call from an originating terminal to a destination terminal, the call-connection device comprising:
   a controller processing call connection requests from originating terminals to destination terminals, the controller performing call-connection processing for connecting the call from the originating terminal to the destination terminal and performing call-termination processing without waiting for a disconnection request transmitted from the originating terminal or the destination terminal,
   wherein, during the call-termination processing, the controller performs call-disconnection processing between the originating terminal and the destination terminal by transmitting a call-disconnection signal to the destination terminal in response to a ring-back tone signal after transmitting a call-setup signal to the destination terminal and before a call-setup processing responsive to the call-setup signal is completed in the destination terminal, the call-setup signal instructing an execution of the call-setup processing, the call-disconnection signal instructing an execution of the call-disconnection processing, the ring-back tone signal being transmitted in response to the call-setup signal from the destination terminal to the call-connection device.

9. The call-connection device of claim 8, wherein said controller performing the call-connection processing when operating upon occurrence of a predetermined condition.

10. The call-connection device of claim 9, wherein the predetermined condition is a congestion state.

11. The call-connection device of claim 9, wherein the predetermined condition is a flag set by a maintenance operation.

12. The call-connection device of claim 8, wherein the controller further detects whether or not a number of a call made by the originating terminal is a predetermined number, and
   where it is detected that the call number is the predetermined number, the call-connection device performs the call-connection processing by connecting the call to the destination terminal without performing the call-termination processing prior to the disconnection request transmitted from the originating terminal or the destination terminal.

13. The call-connection device of claim 8, wherein, the call-connection device transmits a message signal before performing the call-termination processing so that a predetermined message is transmitted to at least one of the originating terminal and the destination terminal.

14. The call-connection device of claim 13, wherein the predetermined message provides an indication of the originating terminal's telephone number to the destination terminal.

15. The call-connection device of claim 8, wherein the call-termination processing discontinues a call attempt prior to completing a connection for communication, but after signaling provides a predetermined message.

16. A non-transitory computer readable medium embodying a computer executable code for causing a processor of a call-connection device configured to connect a call from an originating terminal to a destination terminal, to execute:
   processing call connection requests from originating terminals to destination terminals;
   performing call-connection processing for connecting the call from the originating terminal to the destination terminal; and
   performing call-termination processing without waiting for a disconnection request transmitted from the originating terminal or the destination terminal,
   wherein the performing call-termination processing includes performing call-disconnection processing between the originating terminal and the destination terminal by transmitting a call-disconnection signal from the call-connection device to the destination terminal in response to a ring-back tone signal after transmitting a call-setup signal from the call-connection device to the destination terminal and before a call-setup processing responsive to the call-setup signal is completed in the destination terminal, the call-setup signal instructing an execution of the call-setup processing, the call-disconnection signal instructing an execution of the call-disconnection processing, the ring-back tone signal being transmitted in response to the call-setup signal from the destination terminal to the call-connection device.

17. The non-transitory computer readable medium embodying the computer executable code of claim 16 further causing the processor to execute performing the call-termination processing without waiting for a disconnection request when operating upon occurrence of a predetermined condition.

18. The non-transitory computer readable medium embodying the computer executable code of claim 16 further causing the processor to execute:
   detecting whether or not a number of a call made by the originating terminal is a predetermined number,
   wherein, where it is detected that the call number is the predetermined number, the call-connection device performs the call-connection processing without performing the call-termination processing prior to the disconnection request.

19. The non-transitory computer readable medium embodying the computer executable code of claim 16 further causing the processor to execute transmitting a message signal before performing the call-termination processing so that a predetermined message is transmitted to at least one of the originating terminal and the destination terminal.

20. The non-transitory computer readable medium embodying the computer executable code of claim 16 further causing the processor to discontinue a call attempt prior to completing a connection for communication, but after signaling provides a predetermined message.

* * * * *